(12) United States Patent
Oh

(10) Patent No.: US 6,543,723 B1
(45) Date of Patent: Apr. 8, 2003

(54) ELECTRIC ORBIT RAISING WITH VARIABLE THRUST

(75) Inventor: David Oh, Sunnyvale, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/947,186

(22) Filed: Sep. 4, 2001

(51) Int. Cl.⁷ ................................................. B64G 1/40
(52) U.S. Cl. ................................... 244/172; 244/158 R
(58) Field of Search ............................ 244/158 R, 164, 244/169, 172

(56) References Cited

U.S. PATENT DOCUMENTS

| | | | | |
|---|---|---|---|---|
| 4,825,646 A | * | 5/1989 | Challoner et al. | 244/169 |
| 5,186,419 A | * | 2/1993 | Scott | 244/158 R |
| 5,456,429 A | * | 10/1995 | Mayersak | 244/172 |
| 5,595,360 A | * | 1/1997 | Spitzer | 244/158 R |
| 5,716,029 A | * | 2/1998 | Spitzer et al. | 244/158 R |
| 5,845,880 A | * | 12/1998 | Petrosov et al. | 244/169 |
| 5,934,619 A | * | 8/1999 | Fischer et al. | 244/164 |
| 6,032,904 A | * | 3/2000 | Hosick et al. | 244/169 |
| 6,186,446 B1 | * | 2/2001 | Tilley et al. | 244/158 R |

* cited by examiner

Primary Examiner—Michael J. Carone
Assistant Examiner—Gabriel S. Sukman
(74) Attorney, Agent, or Firm—Kenneth W. Float

(57) ABSTRACT

Systems and methods for launching a satellite into orbit that optimize the mass of the satellite delivered into orbit. A satellite carrying one or more chemical propulsion devices and one or more electric propulsion devices is launched into a transfer orbit using a launch vehicle. In one embodiment, a selected chemical propulsion device is fired to raise the orbit of the satellite from the transfer orbit to an intermediate orbit. One or more electric propulsion device is fired to raise the orbit of the satellite from the intermediate orbit to final geosynchronous orbit and the one or more electric propulsion device is throttled to produce variable thrust levels so as to operate at all optimum specific impulse level to optimize the mass of the satellite delivered into orbit. In another embodiment, the electric propulsion device may deliver the satellite into a near-geosynchronous orbit instead of final geosynchronous orbit. In this case, a selected chemical propulsion device is fired to place the satellite in its final orbit. In yet another embodiment, the launch vehicle may be used to deliver the satellite into the intermediate starting orbit after which the electric propulsion device is used to achieve final orbit. In this case, the transfer orbit raising step is omitted.

20 Claims, 3 Drawing Sheets

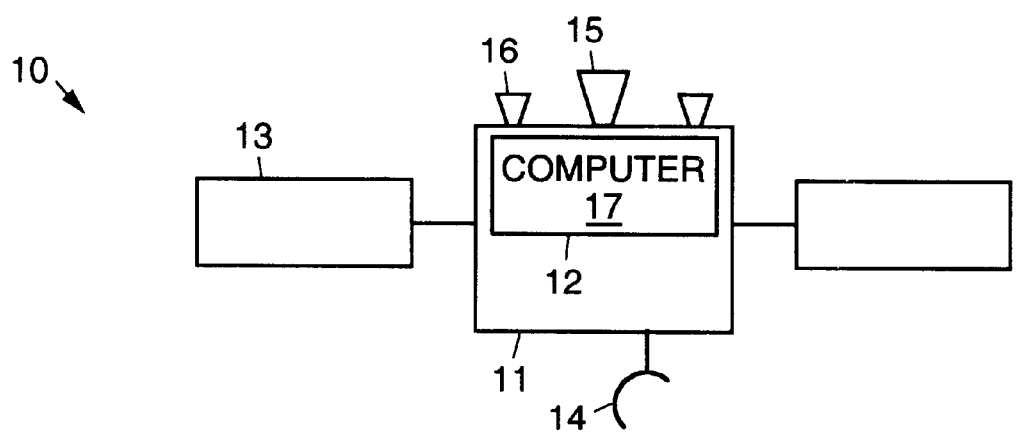
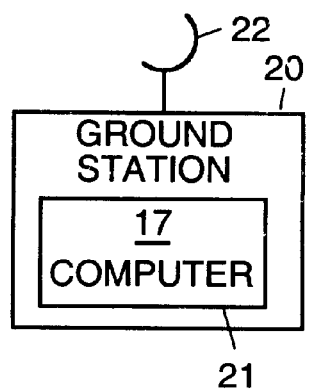
Fig. 1

ELECTRIC ORBIT RAISING WITH VARIABLE THRUST

BACKGROUND

The present invention relates generally to satellites, and more particularly, to systems and methods that raise the orbit of a satellite using variable thrust produced by electric propulsion thrusters The assignee of the present invention manufactures and deploys spacecraft that orbit the earth. Heretofore, numerous efforts have been made to determine the optimum electric orbit raising profile with a fixed thrust level. These efforts include SEPSPOT and HYTOP simulations, for example known to those skilled in the art. Hughes has used electric orbit raising with fixed thrust on their 702 satellites. The Deep Space 1 satellite has used a variable thrust electric thruster in a non-orbit raising application for power management, but not to increase payload mass.

Prior art has generally used fixed thrust levels for orbit raising. Some prior art has considered the use of variable thrust levels to optimize the power profile for non-orbit raising electric missions. No prior art has considered how one may use variable thrust levels during orbit raising specifically to increase payload mass delivered in electric orbit raising. It has been determined by the present inventor that, with throttling, the effective mass benefits of electric orbit raising can be increased by about 25%.

Therefore, it would be advantageous to have improved systems and methods that raise the orbit of a satellite into orbit. It would also be advantageous to have improved systems and methods that use variable thrust levels in electric orbit raising to optimize the payload mass delivered into orbit.

SUMMARY OF THE INVENTION

To meet the above and other objectives, the present invention provides for systems and methods that use variable thrust levels in electric orbit raising to optimize the payload mass delivered into orbit. Electric orbit raising uses electric propulsion for satellite orbit raising. In general, electric orbit raising allows the delivery of more payload mass into orbit in exchange for additional orbit raising time. The present invention further increases the payload mass that can be delivered using electric orbit raising without increasing the time or power needed for the satellite to reach orbit.

An exemplary method 30 comprises a method to launch a satellite into orbit that optimizes the mass of the satellite delivered into orbit. The method comprises the following steps. A satellite carrying one or more chemical propulsion devices and one or more electric propulsion devices 16 is launched into a transfer orbit using a launch vehicle. A selected one of the chemical propulsion devices is fired to raise the orbit of the satellite from the transfer orbit to an intermediate orbit. One or more of the electric propulsion devices is fired to raise the orbit of the satellite from the intermediate orbit to final geosynchronous orbit, wherein the one or more electric propulsion thrusters are throttled to produce variable thrust levels so that they operate at an optimum specific impulse level to optimize the mass of the satellite delivered into orbit.

Exemplary systems comprise a satellite including an on-board computer. One or more solar arrays, a communication link, one or more chemical propulsion devices, and one or more electric propulsion devices. A launch vehicle is used to lift the satellite from the earth into a transfer orbit. A ground station having a computer and a communication link is used to communicate with the satellite.

A computer program is preferably employed either in the satellite or at the ground station that fires a selected one of the chemical propulsion devices to raise the orbit of the satellite from the transfer orbit to an intermediate orbit. The computer program is then used to fire a selected set of the electric propulsion devices to raise the orbit of the satellite from the intermediate orbit to final geosynchronous orbit. The computer program is operative to throttle the one or more electric propulsion thrusters to produce variable thrust levels so that they operate at an optimum specific impulse level to optimize the mass of the satellite delivered into orbit.

The computer program may be located in the on-board computer and operates without substantial ground control. Alternatively, the computer program may be located at the ground station and operates under control from the ground station. Alternatively, control commands that fire the thrusters may be manually generated at the ground station and uplinked to the satellite under operator control.

BRIEF DESCRIPTION OF THE DRAWINGS

The various features and advantages of the present invention may he more readily understood with reference to the following detailed description taken in conjunction with the accompanying drawings, wherein like reference numerals designate like structural elements, and in which:

FIG. 1 illustrates exemplary systems in accordance with the principles of the present invention;

DETAILED DESCRIPTION

Figure 2:
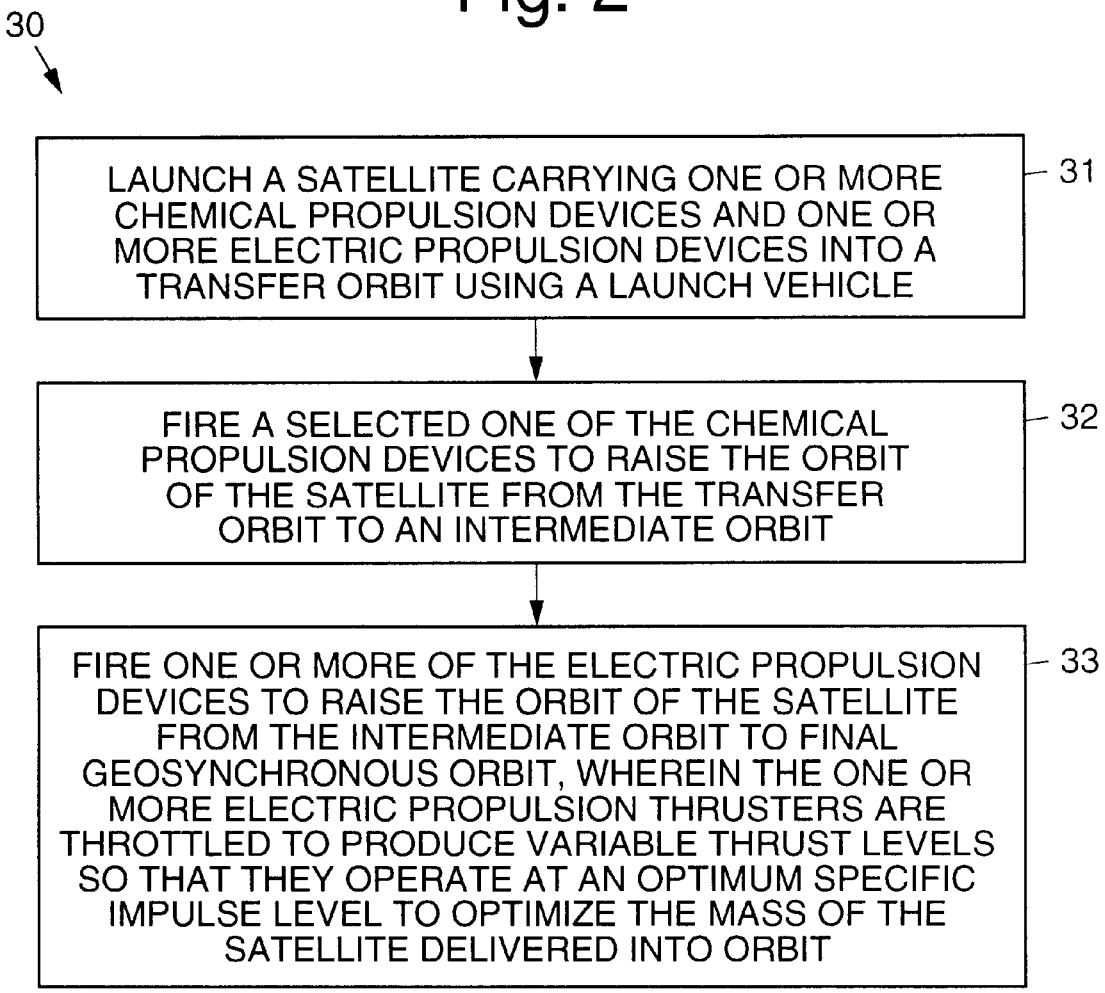
FIG. 2 is a flow diagram that illustrates an exemplary method in accordance with the principles of the present invention.

The following discussion is provided so that the principles of the present invention may be better understood. Electric propulsion systems provide a substantial mass advantage over chemical propulsion systems. Electric propulsion systems operate by converting electrical energy into momentum, typically by heating or ionizing a gas and accelerating it. The propellant mass efficiency of an electric propulsion device is characterized by its specific impulse ($I_{sp}$). An electric propulsion device with a higher $I_{sp}$ requires less propellant mass to provide a given total impulse. However, a device with a higher $I_{sp}$ also requires more energy to provide a given total impulse. Thus, the device will require more power and/or more time to complete a given mission.

Because of the need to balance propellant mass and power capability, there is all optimum $I_{sp}$ (and therefore optimum power level) for every electric propulsion mission. For missions that solely use electric propulsion, the optimum $I_{sp}$ depends on the amount of power available for use by the electric propulsion device. The more power that is available, the higher the optimum specific impulse.

For many years, electric propulsion devices have been used for stationkeeping of geostationary communications satellites. Recently, some manufacturers have obtained additional mass savings by using electric propulsion devices for partial orbit raising. This is referred to as electric orbit raising. Electric orbit raising increases the payload mass delivered to orbit, but also requires additional flight time. Over a 90 day mission, for example, electric orbit raising can increase payload mass by several hundred kilograms. Both time and power are critical parameters for electric orbit raising. The amount of time available for electric orbit raising is limited by the needs of a customer, and the amount of power available is limited by the design of the satellite.

A typical electric orbit raising mission is a mixed chemical-electric mission having an initial phase of chemical orbit raising followed by a phase of orbit raising using electric propulsion. When the amount of power and time available are externally constrained, the combined chemical-electric mission can be described analytically using a modified rocket equation.

As stated above, every electric propulsion mission has an optimum $I_{sp}$. In this case, the optimally $I_{sp}$ maximizes the amount of payload delivered to orbit. The optimum $I_{sp}$ for a chemical-electric orbit raising mission is approximately:

$$I_s^* = \frac{2c_1}{g\eta_v} \quad (1)$$

where $c_1$ is the effective exhaust velocity of the chemical thruster. The term eta-v ($\eta_v$) is the planning efficiency for the electric portion of the mission, and $I^*_s$ is the optimum $I_{sp}$ for the electric thruster. The planning efficiency is defined as $$\eta_v = \frac{\Delta v_{chemical}}{\Delta v_{electrical}},$$

where delta-v electrical is the delta-v delivered by the electric thruster and delta-v chemical is the amount of chemical delta-v replaced by the electric portion of the mission. Equation (1) is of itself innovative in that it has never been reported in the general literature. It should be noted that equation (1) is an approximation derived by solving a substantially more complicated general expression for the optimum $I_{sp}$.

The novelty of the present invention comes from the realization that eta-v ($\eta_v$) can be defined as a local parameter and a local value can be associated with any given point in an orbit. Since eta-v ($\eta_v$) varies with location, it follows that the optimum specific impulse also varies with location. In accordance with the present invention, it is desirable to throttle the thruster so it always operates at the optimum specific impulse level. This requires throttling the thruster throughout electric orbit raising.

To illustrate this result, a simulation was made of a simple electric orbit raising mission. The simulation considers an electric orbit raising mission in which electric propulsion is used to change the inclination of a circular orbit.

A thruster is fired continuously in a direction perpendicular to the plane of the orbit and the final orbit is a circular geostationary orbit. One day of electric orbit raisins is simulated. The amount of chemical delta-v needed to do this mission is given by:

$$\Delta i \approx v\sqrt{R/\mu}.$$

Where R is the radius of the orbit and $\mu$ is the gravitational constant times the mass of the Earth ($3.986\times10^{14} m^3/s^2$). The amount of electric delta-v for a conventional constant thrust mission is given by:

$$\Delta i \approx 2/\pi \sqrt{R/\mu} \Delta v.$$

The average planning efficiency is given by the ratio of the above two equations and works out to about 64%. With 9000 Watts of power for electric orbit raising, time limited to 1 day, an electric thruster efficiency of 50%, and a chemical Isp of 310 seconds, the optimum electric $I_{sp}$ is 970 seconds. The corresponding payload mass benefit is 8.57 kg/day of electric orbit raising.

Although the average planning efficiency is 64%, the local planning efficiency is a function of orbital position. In this case, the local planning efficiency is given by:

$$\eta_{vlocal} = \frac{2c_1}{\cos\theta},$$

where theta ($\theta$) is the angle between the line of nodes and the satellite's current orbital position. Averaging this quantity over a full orbit gives an average efficiency of 64%. A mission was simulated in which the thruster's specific impulse was throttled continuously so that:

$$c_2 = \frac{2c_1}{\cos\theta},$$

where $c_2$ is the specific impulse of the electric thruster. With the same assumptions as in the fixed thrust case (i.e., no increase in power or time), the payload mass benefit is 10.57 kg/day. This is a 23% increase in performance with no change in power or time required for electric orbit raising. This result is summarized in the table below

TABLE 1

Payload mass increase for inclination only electric orbit raising mission

|  | Payload Mass Benefit for 1 Day of EOR | Percent Improvement |
| --- | --- | --- |
| Fixed thrust (prior art) | 8.57 kg. | 0% |
| Variable thrust (this invention) | 10.57 kg | 23% |

This simple simulation demonstrates that using, variable specific impulse levels during orbit raising can increase the payload mass delivered to orbit.

In implementing the present invention, an actively managed, throttlable electric propulsion system is used for electric orbit raising. The specific impulse is throttled up and down for the purpose of increasing the payload mass delivered to orbit. The present invention has a combination of the following characteristics.

The present invention changes the thrust end/or specific impulse of the electric propulsion device to increase payload mass delivered to orbit. The present invention throttles and steers the spacecraft and/or thruster to increase payload mass delivered to orbit. The present invention takes into account power available for the electric propulsion device.

The present invention allows the incorporation of coasting periods when the electric propulsion device is turned off. The present invention may use a closed or open loop throttle management system to control the electric propulsion device that operates either autonomously in an on-board computer, autonomously in a ground-based computer that generates commands that are uplinked to the satellite, or manually by an operator at a ground station who generates commands that are uplinked to the satellite.

With the above in mind, and referring to the drawing figures. FIG. 1 illustrates exemplary systems 10 in accordance with the principles of the present invention. The exemplary systems 10 comprise a satellite 11 including an on-board computer 12, one or more solar arrays 13, a communication link 14, one or more chemical propulsion devices 15, and one or more electric propulsion devices 16. A launch vehicle is used to lift the satellite 11 from the earth into a transfer orbit. A ground station 20 having a computer 21 and a communication link 22 is used to communicate with the satellite 11.

A computer program 17 is preferably employed either in the satellite 11 or at the ground station 20 that fires a selected one of the chemical propulsion devices 15 to raise the orbit of the satellite 11 from the transfer orbit to an intermediate orbit. The computer program 17 is then use to fire a selected one of the electric propulsion devices 16 to raise the orbit of the satellite 11 from the intermediate orbit to final geosynchronous orbit. The computer program 17 is operative to throttle the one or more electric propulsion thrusters 16 to produce variable thrust levels so that they operate at an optimum specific impulse level to optimize the mass of the satellite 11 delivered into orbit.

In one embodiment of the system 10, the computer program 17 is located in the on-board computer 12 and operates without substantial ground control. In another embodiment of the system 10, the computer program 17 is located at the ground station 20 and operates under control from the ground station 20. In another embodiment of the system 10, control commands that fire the thrusters 15, 16 are manually generated at the ground station 20 using the computer program 17 and uplinked to the satellite 11.

The computer program 17 computes an optimum specific impulse for launching the satellite 11 into orbit using the chemical and electric propulsion devices 15, 16 using the equation:

$$c_{optimum} = \frac{2c_1}{\eta_v},$$

where $c_1$ is the specific impulse of the selected chemical propulsion device 15. $\eta_v$ is the planning efficiency for a portion of the launch using the selected electric propulsion device 16, and $c_{optimum}$ is the optimum specific impulse for the selected electric propulsion device 16.

The planning efficiency used by the computer program 17 is given by the equation:

$$\eta_v = \frac{\Delta v_{chemical}}{\Delta v_{electrical}},$$

where delta-v electrical is the delta-v delivered by the selected electric propulsion device 16 and delta-v chemical is the amount of chemical delta-v replaced by the portion of the mission using the selected electric propulsion device 16.

The present invention may use one of the following electric propulsion devices 16: a continuously throttleable electric propulsion device 16: a "dual mode" electric propulsion device 16 with two distinct regimes of operations: high and low specific impulse; a multi-mode electric propulsion device 16 with more than two distinct regimes of operation; a continuously throttleable Hall Effect (e.g:, SPT) thruster; a dual-mode Hall effect thruster 16 with two distinct regimes of operation: high and low voltage; or a multi-mode Hall effect thruster 16.

FIG. 2 is a flow diagram that illustrates an exemplary method 30 in accordance with the principles of the present invention. The method 30 is operative to launch a satellite 11 into orbit that optimizes the mass of the satellite 11 delivered into orbit. The method 30 comprises the following steps.

Figure 3:
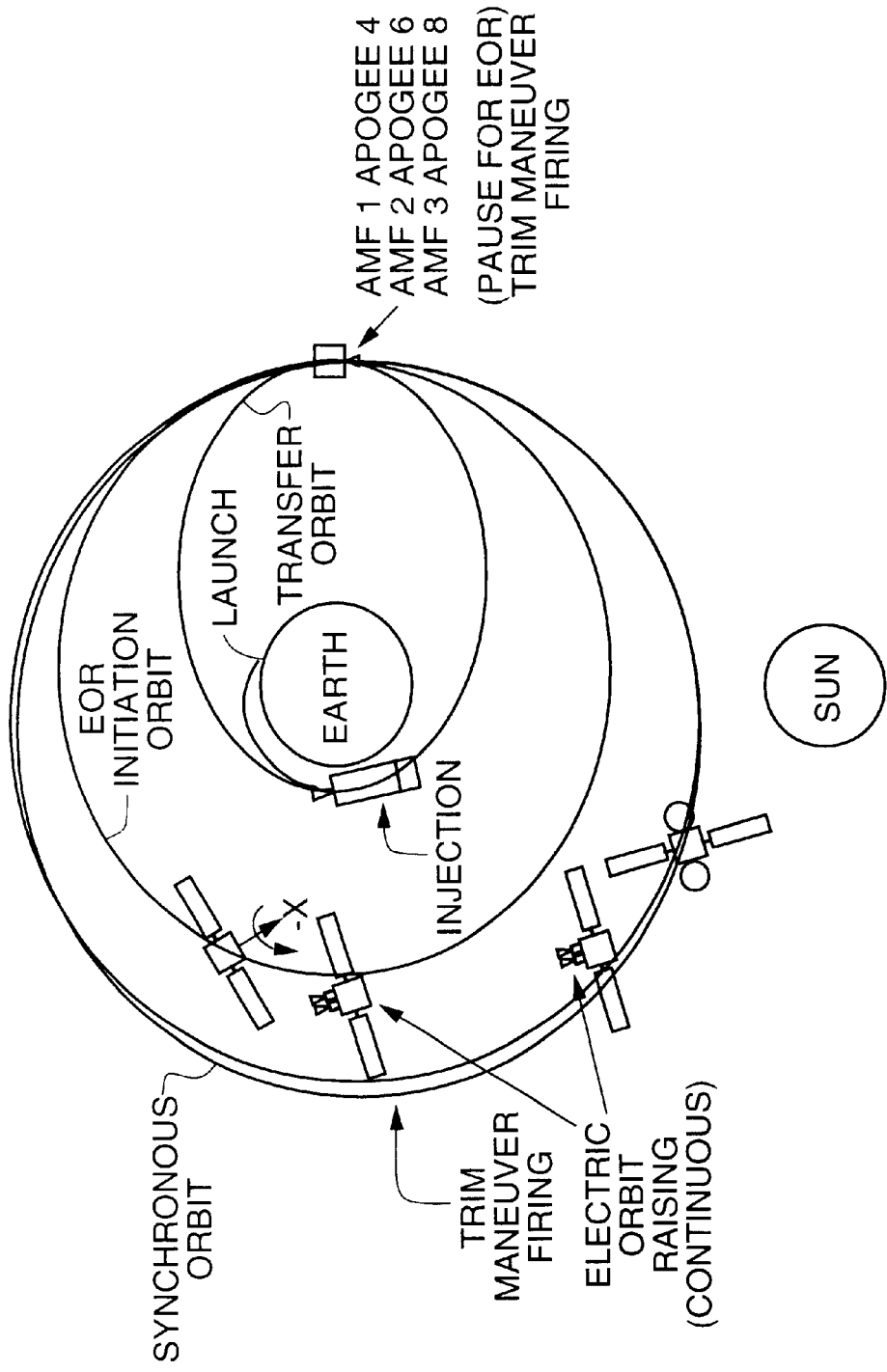
FIG. 3 shows a typical electric orbit raising sequence.

A satellite 11 carrying one or more chemical propulsion devices 15 and one or more electric propulsion devices 16 is launched 31 into a transfer orbit using a launch vehicle. A selected one of the chemical propulsion devices 15 is fired 32 to raise the orbit of the satellite 11 from the transfer orbit to an intermediate orbit. A selected one or more of the electric propulsion devices 16 is fired 33 to raise the orbit of the satellite 11 from the intermediate orbit to final geosynchronous orbit, wherein the one or more electric propulsion thrusters 16 is throttled to produce variable thrust levels so as to operate at an optimum specific impulse level to optimize the mass of the satellite 11 delivered into orbit. This orbit raising sequence is illustrated in FIG. 3. Trim maneuvers and apogee maneuver firings (AMF's) shown in FIG. 3 are performed using chemical propulsion devices 15.

On some missions, the electric propulsion devices 16 may deliver the satellite 11 into a near-geosynchronous orbit at the end of step 33. In this case, a selected chemical propulsion device 15 is fired to place the satellite 11 in its final orbit.

On some missions, the launch vehicle may be used to deliver the satellite 11 directly into the intermediate starting orbit after which the electric propulsion device 16 is used to achieve final orbit. In this case, step 32 is omitted. The general method of calculating the optimum specific impulse level, including equation (1), still applies with the upper stage of the launch vehicle acting as a chemical propulsion device (thruster).

Thus, systems and methods have been disclosed that use variable thrust levels in electric orbit raising to optimize the payload mass delivered into orbit. It is to be understood that the described embodiments are merely illustrative of some of the many specific embodiments which represent applications of the principles of the present invention. For example, it is to be understood that the present invention does not have application only to orbit raising missions, it is also applicable to any combined chemical-electric propulsion mission in which it is possible to derive a local planning, efficiency. Clearly, numerous and other arrangements can be readily devised by those skilled in the art without departing from the scope of the invention.

What is claimed is:

1. A method for launching a satellite into orbit that optimizes the mass of the satellite delivered into orbit, comprising the steps of:

launching a satellite carrying one or more chemical propulsion devices and one or more electric propulsion devices into a transfer orbit using a launch vehicle;

firing a selected chemical propulsion device to raise the orbit of the satellite from the transfer orbit to an intermediate orbit; and firing a selected electric propulsion device to raise the orbit of the satellite from the intermediate orbit to final geosynchronous orbit, wherein the selected electric propulsion device is throttled throughout electric orbit raising to produce variable thrust levels so as to operate at an optimum specific impulse level.

2. The method recited in claim 1 wherein the optimum specific impulse for launching the satellite into orbit using chemical and electric propulsion devices is given by the equation:

$$c_{optimum} = \frac{2c_1}{\eta_v},$$

where $c_1$ is the specific impulse of the selected chemical propulsion device, $\eta_v$ is a planning efficiency for a portion of the launch using the selected electric propulsion device, and $c_{optimum}$ is the optimum specific impulse for the selected electric propulsion device.

3. The method recited in claim 2 wherein the planning efficiency is given by the equation:

$$\eta_v = \frac{\Delta v_{chemical}}{\Delta v_{electrical}},$$

where delta-v electrical is the delta-v delivered by the selected electric propulsion device and delta-v chemical is the amount of chemical delta-v replaced by the portion of the mission using the selected electric propulsion device.

4. The method recited in claim 1 wherein the specific impulse of the selected electric device is throttled up and down.

5. The method recited in claim 1 wherein the selected electric propulsion device is selected from a group including a continuously throttleable electric propulsion device, a dual mode electric propulsion device with two distinct regimes of operations including high and low specific impulse, a multi-mode electric propulsion device with more than two distinct regimes of operation, a continuously throttleable Hall Effect thruster, a dual-mode Hall effect thruster with two distinct regimes of operation including, high and low voltage, and a multi-mode Hall effect thruster.

6. The method recited in claim 1 wherein the step of firing a selected electric propulsion device changes the thrust and/or specific impulse of the selected electric propulsion device.

7. The method recited in claim 1 wherein firing of the selected electric propulsion device is implemented to achieve throttle management using a computer on-board the satellite.

8. The method recited in claim 1 wherein firing of the selected electric propulsion device is implemented to achieve throttle management using a ground-based computer that generates commands that are uplinked to the satellite.

9. The method recited in claim 1 wherein firing of the selected electric propulsion device is manually implemented to achieve throttle management by an operator at a ground station who generates commands that are uplinked to the satellite.

10. A method for launching a satellite into orbit that optimizes the mass of the satellite delivered into orbit, comprising the steps of:
    launching a satellite carrying one or more chemical propulsion devices and one or more electric propulsion devices into a transfer orbit using a launch vehicle;
    firing a selected chemical propulsion device to raise the orbit of the satellite from the transfer orbit to an intermediate orbit;
    firing a selected electric propulsion device to raise the orbit of the satellite from the intermediate orbit to a near geosynchronous orbit, wherein the selected electric propulsion device is throttled throughout electric orbit raising to produce variable thrust levels so as to operate at an optimum specific impulse level; and
    firing a selected chemical propulsion device to place the satellite in its final geostationary orbit.

11. A method for launching a satellite into orbit that optimizes the mass of the satellite delivered into orbit, comprising the steps of:
    launching a satellite carrying one or more chemical propulsion devices and one or more electric propulsion devices into an intermediate orbit using a launch vehicle; and
    firing a selected electric propulsion device to raise the orbit of the satellite from the intermediate orbit to final geosynchronous orbit, wherein the selected electric propulsion device is throttled throughout electric orbit raising to produce variable thrust levels so as to operate at an optimum specific impulse level.

12. Apparatus that optimizes the mass of a satellite delivered into orbit, comprising:
    a satellite including an on-board computer, one or more solar arrays, a communication link, one or more chemical propulsion devices, and one or more electric propulsion devices;
    a launch vehicle is used to launch the satellite from the earth into a transfer orbit;
    a ground station having a computer and a communication link is used to communicate with the satellite; and
    a computer program that fires a selected chemical propulsion device to raise the orbit of the satellite from the transfer orbit to an intermediate orbit, and fires a selected electric propulsion device to raise the orbit of the satellite from the intermediate orbit to final geosynchronous orbit, and throttles the selected electric propulsion device throughout electric orbit raising to produce variable thrust levels so as to operate at an optimum specific impulse level.

13. The apparatus recited in claim 12 wherein the computer program is located in the on-board computer on the satellite.

14. The apparatus recited in claim 12 wherein the computer program is disposed at the ground station.

15. The apparatus recited in claim 12 wherein the optimum specific impulse for launching the satellite into orbit using chemical and electric propulsion devices is given by the equation:

$$c_{optimum} = \frac{2c_1}{\eta_v},$$

where $c_1$ is the specific impulse of the selected chemical propulsion device, $\eta_v$ is a planning efficiency for a portion of the launch using the selected electric propulsion device, and $c_{optimum}$ is the optimum specific impulse for the selected electric propulsion device.

16. The apparatus recited in claim 15 wherein the planning efficiency is given by the equation:

$$\eta_v = \frac{\Delta v_{chemical}}{\Delta v_{electrical}},$$

where delta-v electrical is the delta-v delivered by the selected electric propulsion device and delta-v chemical is the amount of chemical delta-v replaced by the portion of the mission using the selected electric propulsion device.

17. The apparatus recited in claim 12 wherein the computer program is operative to throttle the specific impulse of the selected electric device up and down.

18. The apparatus recited in claim 12 wherein the selected electric propulsion device is selected from a group including a continuously throttleable electric propulsion device, a dual mode electric propulsion device with two distinct regimes of operations including high and low specific impulse, a multi-mode electric propulsion device with more than two distinct regimes of operation, a continuously throttleable Hall Effect thruster, a dual-mode Hall effect thruster with two distinct regimes of operation including high and low voltage, and a multi-mode Hall effect thruster.

19. Apparatus that optimizes the mass of a satellite delivered into orbit, comprising:

a satellite including an on-board computer, one or more solar arrays, a communication link, one or more chemical propulsion devices, and one or more electric propulsion devices;

a launch vehicle is used to launch the satellite from the earth into a transfer orbit;

a ground station having a computer and a communication link is used to communicate with the satellite; and a computer program that fires a selected chemical propulsion device to raise the orbit of the satellite from the transfer orbit to an intermediate orbit, fires a selected electric propulsion device to raise the orbit of the satellite from the intermediate orbit to a near geosynchronous orbit, and throttles the selected electric propulsion device throughout electric orbit raising to produce variable thrust levels so as to operate at an optimum specific impulse level, and fires a selected chemical propulsion device to place the satellite in its final geostationary orbit.

20. Apparatus that optimizes the mass of a satellite delivered into orbit, comprising:

a satellite including an on-board computer, one or more solar arrays, a communication link, one or more chemical propulsion devices, and one or more electric propulsion devices;

a launch vehicle is used to launch the satellite from the earth into an intermediate orbit;

a ground station having a computer and a communication link is used to communicate with the satellite; and a computer program that fires a selected electric propulsion device to raise the orbit of the satellite from the intermediate orbit to final geosynchronous orbit, and throttles the selected electric propulsion device throughout electric orbit raising to produce variable thrust levels so as to operate at an optimum specific impulse level.

\* \* \* \* \*